(12) United States Patent
Li et al.

(10) Patent No.: US 11,551,876 B2
(45) Date of Patent: Jan. 10, 2023

(54) PRESSURE RELIEF VALVE AND AN ELECTROLYTIC CAPACITOR THEREWITH

(71) Applicant: DONGGUAN HEC TECH R&D CO., LTD., Guangdong (CN)

(72) Inventors: Gang Li, Dongguan (CN); Weifu Dong, Dongguan (CN); Yingfeng Yu, Dongguan (CN); Fengrong He, Dongguan (CN); Mingxing Fu, Dongguan (CN)

(73) Assignee: DONGGUAN HEC TECH R&D CO., LTD., Dongguan (CN)

( * ) Notice: Subject to any disclaimer, the term of this patent is extended or adjusted under 35 U.S.C. 154(b) by 0 days.

(21) Appl. No.: 17/345,808

(22) Filed: Jun. 11, 2021

(65) Prior Publication Data
US 2022/0020535 A1 Jan. 20, 2022

(30) Foreign Application Priority Data
Jul. 14, 2020 (CN) .......................... 202021381850.8

(51) Int. Cl.
*H01G 9/12* (2006.01)
*H01G 9/035* (2006.01)

(52) U.S. Cl.
CPC .............. *H01G 9/12* (2013.01); *H01G 9/035* (2013.01)

(58) Field of Classification Search
CPC ................................. H01G 9/12; H01G 9/035
See application file for complete search history.

(56) References Cited

U.S. PATENT DOCUMENTS

| 4,245,277 | A | * | 1/1981 | van Gils | .................. H01G 9/12 29/25.03 |
| 2002/0076604 | A1 | * | 6/2002 | Matsuoka | ........... H01M 50/308 429/81 |
| 2009/0303662 | A1 | * | 12/2009 | Sakata | .................... H01G 11/82 361/519 |
| 2010/0149728 | A1 | * | 6/2010 | Shimizu | .................. H01G 9/12 361/519 |

(Continued)

FOREIGN PATENT DOCUMENTS

| CN | 103794375 B | * | 2/2017 | .............. H01G 9/08 |
| CN | 109065361 A | | 12/2018 | |

(Continued)

*Primary Examiner* — Dion R. Ferguson
(74) *Attorney, Agent, or Firm* — Oliff PLC

(57) ABSTRACT

A pressure relief valve and an electrolytic capacitor, including: a valve seat, wherein an exhaust passage is formed, an installation groove arranged on the top which communicates with the passage; a blocking cover, movably arranged on the groove between an open and a closed position for opening and closing the passage, a sealing ring arranged between the bottom of the cover and the groove, wherein at least part of the bottom wall forms a guide surface, which extends from the center of the cover radially outward and upward obliquely to the radial edge. The valve can be suitable for the installation of the capacitor to reduce the internal gas pressure therein, maintain the internal gas pressure within a safe range, and at the same time reduce the bulging of the bottom of the capacitor, so that the core package and the bottom are closely attached to achieve effective heat dissipation.

16 Claims, 6 Drawing Sheets

(56) References Cited

U.S. PATENT DOCUMENTS

| | | | | |
|---|---|---|---|---|
| 2011/0262782 A1* | 10/2011 | Zhu | ................... | H01M 50/325 |
| | | | | 429/54 |
| 2012/0328913 A1* | 12/2012 | Chuang | ............... | H01M 50/543 |
| | | | | 429/54 |
| 2013/0208405 A1* | 8/2013 | Okada | ................ | H01M 50/383 |
| | | | | 361/521 |
| 2014/0240900 A1* | 8/2014 | Mori | ........................ | H01G 9/08 |
| | | | | 361/521 |
| 2015/0217417 A1* | 8/2015 | Takeshita | ................ | B23P 19/04 |
| | | | | 29/890.12 |
| 2016/0036024 A1* | 2/2016 | Choi | ................... | H01M 50/325 |
| | | | | 429/54 |
| 2018/0323013 A1* | 11/2018 | Yoneda | .................. | H01G 11/80 |
| 2022/0020535 A1* | 1/2022 | Li | ............................ | H01G 9/12 |

FOREIGN PATENT DOCUMENTS

| | | | | |
|---|---|---|---|---|
| CN | 208673911 U | | 3/2019 | |
| CN | 209981002 U | | 1/2020 | |
| CN | 210566581 U | * | 5/2020 | |
| CN | 112503234 A | * | 3/2021 | |
| CN | 213815853 U | * | 7/2021 | |
| DE | 102020130036 A1 | * | 5/2021 | ........... F16K 17/164 |
| JP | H10-208986 A | | 8/1998 | |
| JP | 2018-190791 A | | 11/2018 | |
| WO | WO-2016093100 A1 | * | 6/2016 | ............. H01G 11/16 |

* cited by examiner

PRESSURE RELIEF VALVE AND AN ELECTROLYTIC CAPACITOR THEREWITH

CROSS-REFERENCE TO RELATED APPLICATION

This application claims the priority and benefits of Chinese Patent Application No. 202021381850.8, filed with the State Intellectual Property Office of China on Jul. 14, 2020, which is incorporated herein by reference in its entirety.

FIELD OF THE UTILITY MODEL

The present utility model relates to capacitor technology field, in particular to a pressure relief valve and an electrolytic capacitor therewith.

BACKGROUND OF THE UTILITY MODEL

In related technologies, when aluminum electrolytic capacitors are used in a high temperature environment for a long time, they will accelerate the deterioration and volatilization of the internal electrolyte, increase the product loss, and increase the internal temperature rise, which will cause corrosion of the product, bulging of gas production, and slurry explosion, etc. When the slurry explosion of the aluminum electrolytic capacitor occurs on the circuit board, it is easy to cause short circuit, corrosion, or even fire and other dangers of other electronic components on the circuit board.

Especially when the ambient temperature is high (such as T0≥125), the internal gas production of the aluminum electrolytic capacitor is more obvious. The main sources of gas production include solvent volatilization in the electrolyte, water vapor, hydrogen produced by repairing the oxide film, and small molecule gas generated by high temperature cracking of some substances, etc. As a result, the internal gas pressure of the capacitor rises sharply, which makes the capacitor easy to open the valve in advance, and the life span is shortened sharply, and even the slurry explosion of the capacitor occurs due to the excessive internal gas pressure.

SUMMARY OF THE UTILITY MODEL

The present utility model aims to solve at least one of the technical problems existing in the prior art. Therefore, the present utility model proposes a pressure relief valve to reduce the internal gas pressure of the electrolytic capacitor, maintain the internal gas pressure of the electrolytic capacitor always within a safe range, and at the same time reduce the bulging of the bottom of the electrolytic capacitor, so that the core package and the bottom are always closely attached to achieve effective heat dissipation.

The present utility model also aims to propose an electrolytic capacitor with the above-mentioned pressure relief valve, so that the internal gas pressure of the electrolytic capacitor is always maintained within a safe range, effectively reducing the risk of valve opening in advance and the slurry explosion of the product under long-term high temperature, thereby extending product life.

The pressure relief valve according to the embodiment of the present utility model comprises: a valve seat, wherein an exhaust passage is formed on the valve seat, an installation groove is placed on the top of the valve seat, and the installation groove is in communication with the exhaust passage; a blocking cover, wherein the blocking cover is movably placed on the installation groove between an open position for opening the exhaust passage and a closed position for closing the exhaust passage, a sealing ring is placed between the bottom of the blocking cover and the installation groove, wherein at least a part of the bottom wall of the blocking cover forms a guide surface, and the guide surface extends from the center of the blocking cover radially outward and upward obliquely, the guide surface extends to the radial edge of the blocking cover.

The pressure relief valve according to the embodiment of the present utility model, through the blocking cover moves in the installation groove to open the exhaust passage. In this way, when the pressure relief valve is suitable for the installation of electrolytic capacitor, the pressure can be relieved to reduce the internal gas pressure of the electrolytic capacitor. So that the internal gas pressure of the electrolytic capacitor is always maintained within a safe range, and the bulging of the bottom of the electrolytic capacitor is reduced to achieve effective heat dissipation. In addition, the guide surface is conducive to orienting the direction of gas discharge.

In some embodiments, the bottom wall of the blocking cover tilts gradually from one end to the other end in the diameter direction of the blocking cover to form the guide surface.

In some embodiments, the bottom wall of the blocking cover tilts gradually from the center of the blocking cover to the circumferential edge to form the guide surface.

Specifically, the guide surface is a conical surface.

In some embodiments, the inclination angle of the guide surface ranges from 5 degrees to 15 degrees.

In some embodiments, the pressure relief valve also comprises a resetting member, the resetting member is placed on the valve seat and is used to drive the blocking cover to the closed position when the blocking cover is in the open position.

Specifically, the resetting member comprises an elastic member.

Further, the upper end of the elastic member is connected with the blocking cover and the lower end is fixed relative to the valve seat, and the elastic member is in a constant stretched state.

Furthermore, a first guide rod is placed between the upper end of the elastic member and the blocking cover, the exhaust passage comprises a first guide section, and the first guide rod is placed on the first guide section and can move up and down.

In some alternative embodiments, the pressure relief valve further comprises a first base, the first base is placed on the bottom of the valve seat, and the first base is provided with air hole, the lower end of the elastic member is fixedly connected with the first base.

In some alternative embodiments, the exhaust passage comprises an installation section and a second guide section located above the installation section; the pressure relief valve further comprises an installation member, the installation member comprises a second guide rod and a stop part, the stop part is placed on the bottom end of the second guide rod, the stop part is accommodated in the installation section, the second guide rod is located in the second guide section, two ends of the elastic member are respectively stopped between the top wall of the installation section and the stop part, and the elastic member is in a constant compression state.

The electrolytic capacitor according to the embodiment of the present utility model comprises the pressure relief valve according to any one of the above-mentioned embodiments.

The electrolytic capacitor according to the embodiment of the present utility model, through the blocking cover moves in the installation groove to open the exhaust passage. In this way, the pressure can be relieved to reduce the internal gas pressure of the electrolytic capacitor. So that the internal gas pressure of the electrolytic capacitor is always maintained within a safe range, effectively reducing the risk of valve opening in advance and the slurrye xplosion of the product under long-term high temperature, thereby extending product life. In addition, the guide surface is conducive to orienting the direction of gas discharge.

In some embodiments, the pressure relief valve is placed on the shell of the electrolytic capacitor.

In some embodiments, the pressure relief valve is placed on the cover plate of the electrolytic capacitor.

The additional aspects and advantages of the present utility model will be partly given in the following description, and some will become obvious from the following description, or be learned through the practice of the present utility model.

DESCRIPTION OF THE DRAWINGS

The above and/or additional aspects and advantages of the present utility model will become obvious and easy to understand from the description of the embodiments in conjunction with the following drawings, in which.

Figure 1:
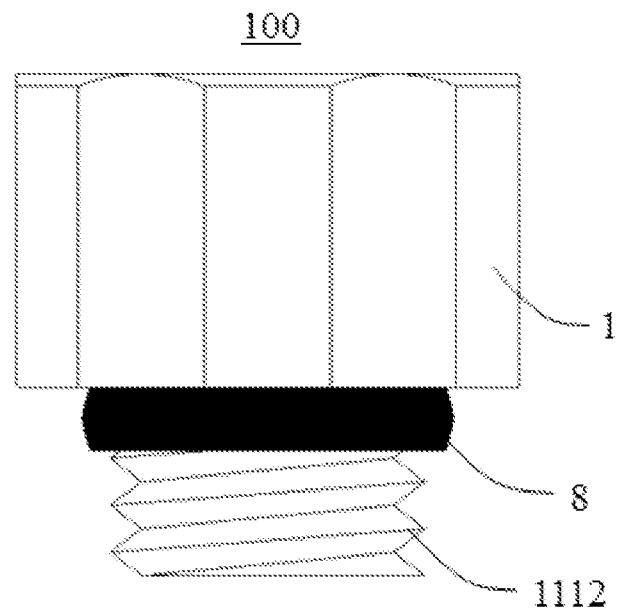
FIG. 1 is a front view of the pressure relief valve in an embodiment of the present utility model.

MARKS OF THE DRAWINGS electrolytic capacitor 1000,
pressure relief valve 100,
valve seat 1, exhaust passage 11, installation section 111,
  external thread structure 1112, second guide section 112,
  first guide section 113, installation groove 14,
blocking cover 2, guide surface 21,
sealing ring 3,
resetting member 4, fixing nail 41,
first guide rod 5,
first base 6, air hole 61,
installation member 7, second guide rod 71, stop part 72,
sealing member 8,
shell 200, installation hole 201, internal thread structure 202,
explosion-proof valve 300.

EXAMPLES

The embodiments of the present utility model are described in detail below, examples are shown in the drawings, in which the same or similar marks indicate the same or similar elements or elements with the same or similar functions. The examples described below via accompanying drawings are intended to be illustrative of the present utility model but not to be construed as limiting.

In the description of the present utility model, it should be understood that the terms "upper", "lower", "top", "bottom", "inner", "outer", "center", "vertical", "horizontal", "axial", "radial", etc. indicate an orientation or a position relations based on the orientation or position shown in the drawings, and is only for the convenience of describing the present utility model and simplifying the description, rather than indicating or implying the device or the element must have a specific orientation, be constructed and operated in a specific orientation, so it cannot be understood as a limitation of the present utility model. In addition, the features defined with "first" or "second" may explicitly or implicitly include one or more of these features.

In the description of the present utility model, it should be noted that, unless otherwise clearly specified and limited, the terms "installation", "connection" and "communication" should be understood in a general understanding. For example, it can be a fixed connection, a detachable connection, an integral connection, a mechanical connection or an electrical connection; and it can be directly or indirectly connected through an intermediate medium, and it can be an internal communication between two components. For those of ordinary skill in the art, the specific meaning of the above-mentioned terms in the present utility model can be understood under specific situation.

The pressure relief valve 100 in the embodiment of the present utility model is described below with reference to FIGS. 1-7.

The pressure relief valve 100 according to the embodiment of the present utility model, as shown in FIGS. 1-4, comprises: a valve seat 1 and a blocking cover 2. An exhaust passage 11 is formed on the valve seat 1, an installation groove 14 is placed on the top of the valve seat 1, and the installation groove 14 is in communication with the exhaust passage 11. The blocking cover 2 is movably placed on the installation groove 14 between an open position for opening the exhaust passage 11 and a closed position for closing the exhaust passage 11, a sealing ring 3 is placed between the bottom of the blocking cover 2 and the installation groove 14, wherein at least a part of the bottom wall of the blocking cover 2 forms a guide surface 21, and the guide surface 21 extends from the center of the blocking cover 2 radially outward and upward obliquely, the guide surface 21 extends to the radial edge of the blocking cover 2.

It can be understood that when the blocking cover 2 is in the closed position, the exhaust passage 11 can be closed. In this way, when the pressure relief valve 100 is suitable for the installation of electrolytic capacitor, it can make the electrolytic capacitor in a closed state, which is convenient to improve the operating efficiency of the electrolytic capacitor. The blocking cover 2 can also move to the open position in the installation groove 14. In this way when the pressure relief valve 100 is suitable for the installation of electrolytic capacitor, the pressure can be relieved to reduce the internal gas pressure of the electrolytic capacitor and the internal gas pressure of the electrolytic capacitor is always maintained within a safe range, and at the same time the bulging of the bottom of the electrolytic capacitor is reduced, so that the core package and the bottom are closely attached to achieve effective heat dissipation.

In addition, the design of the sealing ring 3 is beneficial to improve the air tightness of the blocking cover 2 to close the exhaust passage 11. The design of the guide surface 21 is conducive to orienting the direction of gas discharge. In general pressure relief valves, there is no guide surface 21, the exhaust direction is uncertain, and the sealing ring 3 will be squeezed out by the gas and cause dislocation, even jam the top cover to reset, and cannot ensure resealing.

The pressure relief valve 100 according to the embodiment of the present utility model, through the movement of the blocking cover 2 in the installation groove 14 to open the exhaust passage 11. In this way, when the pressure relief valve 100 is suitable for the installation of electrolytic capacitor, the pressure can be relieved to reduce the internal gas pressure of the electrolytic capacitor, so that the internal gas pressure of the electrolytic capacitor is always maintained within a safe range, and at the same time the bulging of the bottom of the electrolytic capacitor is reduced to achieve effective heat dissipation. In addition, the guide surface 21 is conducive to orienting the direction of gas discharge.

Optionally, when the pressure relief valve 100 is suitable for the installation of electrolytic capacitor, when the internal gas pressure of the electrolytic capacitor exceeds a certain value (M0), the pressure relief valve 100 starts to vent until the pressure relief valve 100 is closed and sealed when the internal gas pressure is lower than a certain value (Mt), here Mt<M0, and M0 can be 150 KPa-800 KPa.

Figure 5:
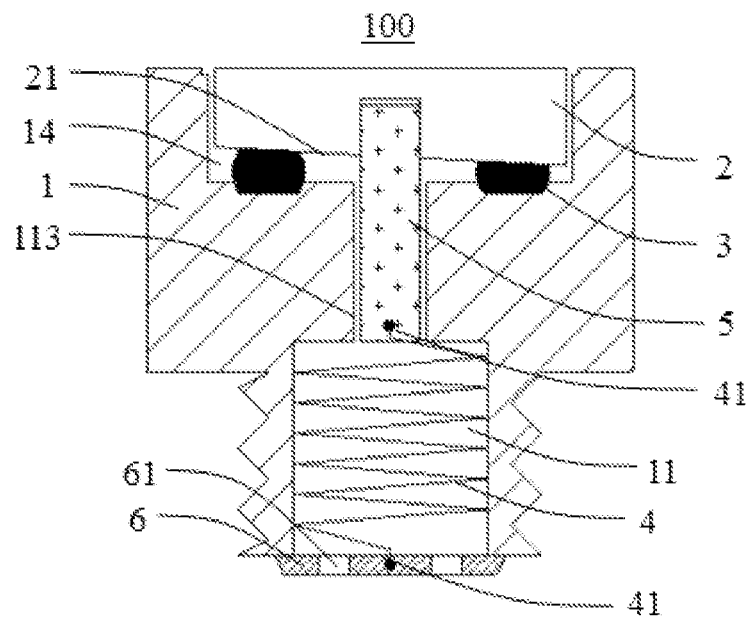
FIG. 5 is a section view of the pressure relief valve in another embodiment of the present utility model.

In some embodiments, as shown in FIGS. 1 and 5, the bottom wall of the blocking cover 2 tilts gradually from one end to the other end in the diameter direction of the blocking cover 2 to form the guide surface 21. This design facilitates the flow of gas and can reduce the obstruction of edges and other factors in the process of gas flow.

Figure 7:
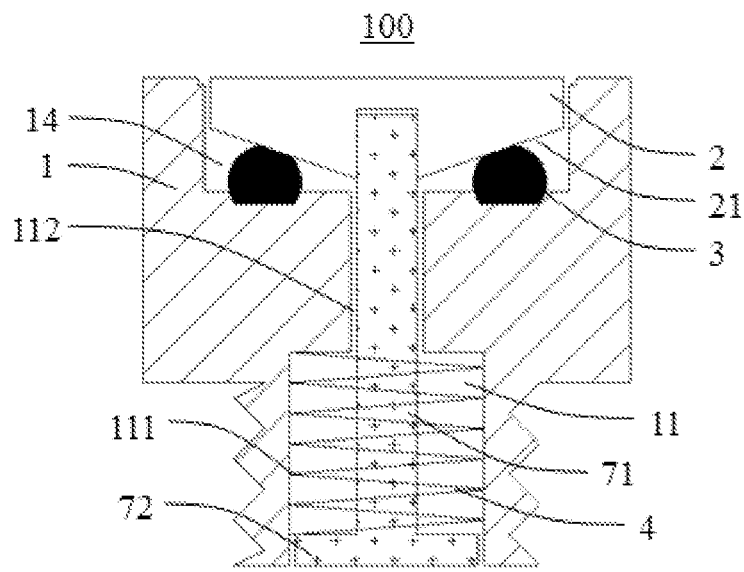
FIG. 7 is a section view of the pressure relief valve in another embodiment of the present utility model.

In some embodiments, as shown in FIG. 7, the bottom wall of the blocking cover 2 tilts gradually from the center of the blocking cover 2 to the circumferential edge to form the guide surface 21. As a result, the guide surface 21 has a larger guide area and can make better contact with the gas, which improves the guiding effect of the guide surface 21, and at the same time prevents the seal ring 3 from shifting or rushing out when the gas pressure is large and the gas is discharged instantly, and guarantees to seal again.

Figure 2:
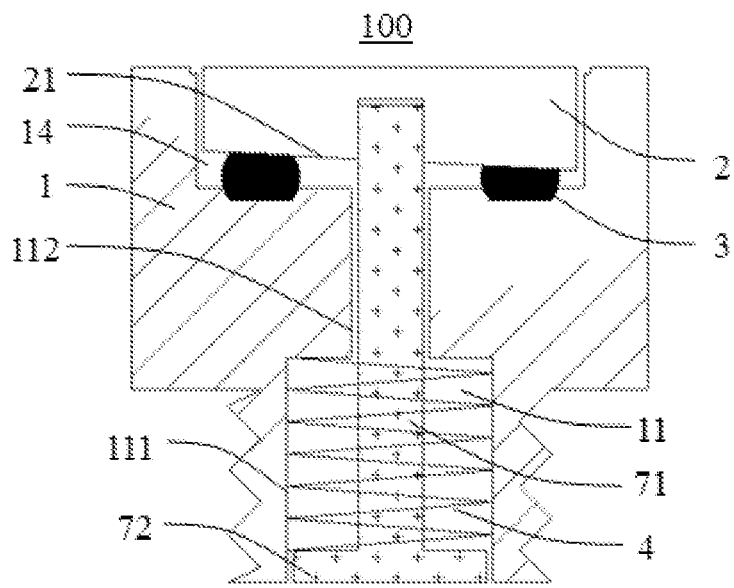
FIG. 2 is a section view of the pressure relief valve in an embodiment of the present utility model.
Figure 3:
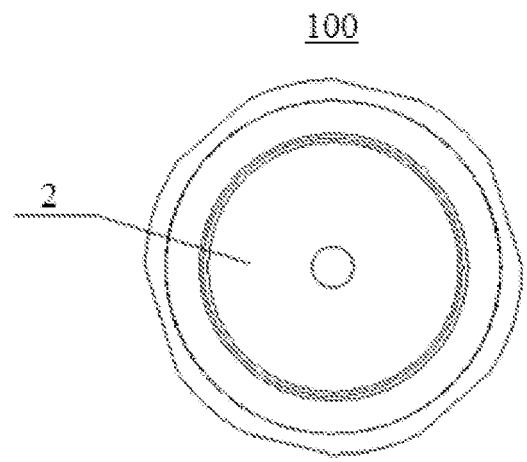
FIG. 3 is a top view of the pressure relief valve in an embodiment of the present utility model.
Figure 4:
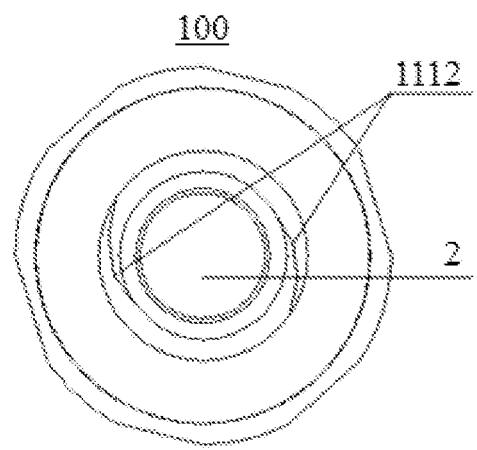
FIG. 4 is a bottom view of the pressure relief valve in an embodiment of the present utility model.

Optionally, as shown in FIGS. 2, 5 and 7, the seal ring 3 can be fixedly installed in the installation groove 14 which is placed on the top of the valve seat 1, and the bottom wall of the installation groove 14 can be placed a positioning groove, the seal ring 3 can be fixedly installed in the positioning groove, so that the installation of the sealing ring 3 can be positioned and fixed.

Specifically, as shown in FIG. 7, the guide surface 21 is a conical surface. It can be understood that the conical surface is easy to process, saving processing costs, and the surface is smoother, which is beneficial to further improve the guiding effect of the guide surface 21.

In some embodiments, the inclination angle of the guide surface 21 ranges from 5 degrees to 15 degrees. In this way, a good guiding effect of the guide surface 21 can be achieved, and the stability of the blocking cover 2 can also be ensured when the exhaust passage 11 is closed.

In some embodiments, as shown in FIGS. 2, 5 and 7, the pressure relief valve 100 also comprises a resetting member 4, the resetting member 4 is placed on the valve seat 1 and is used to drive the blocking cover 2 to the closed position when the blocking cover 2 is in the open position. It can be understood that when venting is required, the blocking cover 2 can be in the open position. When the venting reaches a certain internal pressure value, the blocking cover 2 can move to the closed position under the drive of the resetting member 4 to realize the reseal of the pressure relief valve 100. The design of the resetting member 4 can easily realize the resetting of the blocking cover 2 so as to realize the automatic pressure relief of the pressure relief valve 100, which is beneficial to improve the safety and reliability of the pressure relief valve 100.

Specifically, the resetting member 4 comprises an elastic member. It can be understood that the elastic member has a constant elastic modulus, which can stably drive the resetting of the blocking cover 2, thereby further improving the safety and reliability of the pressure relief valve 100.

Further, as shown in FIG. 5, the upper end of the elastic member is connected with the blocking cover 2 and the lower end is fixed relative to the valve seat 1, and the elastic member is in a constant stretched state. As a result, the design of the blocking cover 2 and the valve seat 1 can limit the position of the elastic member, which makes the elastic member in a constant stretched state, improving the reset stability of the elastic member. When the pressure relief valve 100 is suitable for the installation of electrolytic capacitor, and the gas pressure in the electrolytic capacitor increases to a certain value and is greater than the force of the elastic member on the blocking cover 2, the blocking cover 2 can be pushed to make the elongation of the elastic member increased and open the blocking cover 2, so that the gas can flow out from the open position. When the venting reaches a certain internal pressure value, the elastic member will recover a certain deformation, so that the blocking member moves to the closed position.

Furthermore, as shown in FIG. 5, a first guide rod is placed between the upper end of the elastic member and the blocking cover 2, the exhaust passage 11 comprises a first guide section 113, and the first guide rod is placed in the first guide section 113 and can move up and down. The coordinated design of the first guide rod 5 and the first guide section 113 can guide the deformation movement of the elastic member, thereby reducing the movement deviation of the elastic member and improving the reset reliability of the elastic member.

Optionally, in some other embodiments, the resetting member 4 may also be a detent structure, and the detent structure can be set to drive the blocking cover 2 to the closed position, and also realize the above-mentioned reset function, the specific form of the resetting member 4 is not limited here.

Figure 6:
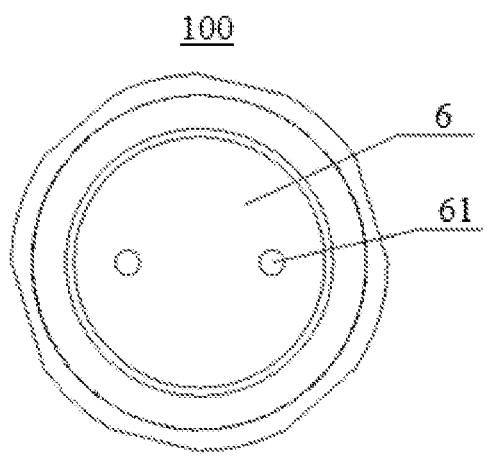
FIG. 6 is a bottom view of the pressure relief valve in another embodiment of the present utility model.

In some optional embodiments, as shown in FIGS. 5 and 6, the pressure relief valve 100 further comprises a first base 6, the first base 6 is placed at the bottom of the valve seat 1, and the first base 6 is provided with air hole 61, the lower end of the elastic member is fixedly connected with the first base 6. It can be understood that the design of the first base 6 can provide a position for the air hole 61, so that it is convenient for the air hole 61 to dredge the gas inside the electrolytic capacitor when the pressure relief valve 100 is suitable for the installation of electrolytic capacitor. In addition, the design of the first base 6 can also increase the structural strength of the pressure relief valve 100 and increase the service life of the pressure relief valve 100.

Optionally, the elastic member may be a spring, which has the advantages of good elasticity and can be reused, thereby helping to improve the working stability of the elastic member. Of course, in some other embodiments, the elastic member may also be an elastic washer, which can also achieve the above-mentioned functions, and the specific form of the elastic member is not limited here.

Optionally, the pressure relief valve 100 is made of high-purity aluminum or stainless steel, and the spring can be stainless steel, alloy, ductile plastic, etc., so that the durability of the pressure relief valve 100 can be improved.

Optionally, as shown in FIG. 5, fixing nails 41 are placed at both ends of the spring. Therefore, the spring can be fixed between the first base 6 and the first guide rod 5 by the fixing nails 41 respectively.

In some alternative embodiments, as shown in FIGS. 2 and 7, the exhaust passage 11 comprises an installation section 111 and a second guide section 112 located above the installation section 111. The pressure relief valve 100 further comprises an installation member 7, the installation member 7 comprises a second guide rod 71 and a stop part 72, the stop part 72 is placed at the bottom end of the second guide rod 71, the stop part 72 is accommodated in the installation section 111, the second guide rod 71 is located in the second guide section 112, two ends of the elastic member are respectively stopped between the top wall of the installation section 111 and the stop part 72, and the elastic member is in a constant compression state. The coordinated design of the second guide rod 71 and the second guide section 112 can guide the deformation movement of the elastic member, thereby reducing the movement deviation of the elastic member and improving the reset reliability of the elastic member. The two ends of the elastic member are respectively stopped between the top wall of the installation section 111 and the stop part 72, so as to provide a stable limiting effect on the elastic member and improve the operating reliability of the elastic member.

Optionally, as shown in FIGS. 2 and 7, when the two ends of the elastic member are respectively stopped between the top wall of the installation section 111 and the stop part 72, the elastic member is in a constant compression state. The compressed elastic member will generate a certain force on the stop part 72, so that the blocking cover 2 is stably located in the closed position. When the pressure relief valve 100 is suitable for electrolytic capacitor, and the gas pressure in the electrolytic capacitor increases to a certain value and is greater than the force of the elastic member on the stop part 72, the gas will push the stop part 72 and continue to compress the elastic member until the blocking cover 2 moves to the open position. When the gas is discharged, the elastic member will recover a certain deformation to reset the blocking cover 2. As a result, the opening and closing of the exhaust passage 11 by controlling the blocking cover 2 can also be realized stably, the specific cooperation form of the elastic member and the blocking cover 2 is not limited here.

Optionally, the second guide rod 71 and the stop part 72 may be an integral structure, thereby improving the structural strength of the installation member 7 and improving the working stability of the installation member 7. Of course, in some other embodiments, the second guide rod 71 and the stop part 72 can be independent components, or they can be connected by a connecting piece, which is convenient for processing, realizing mass production, and can also realize the stable operation of the installation member 7, the specific form of the second guide rod 71 and the stop part 72 are not limited here.

The pressure relief valve 100 in a specific embodiment of the present utility model will be described below with reference to FIG. 7.

The pressure relief valve 100 according to the embodiment of the present utility model comprises: valve seat 1, blocking cover 2, resetting member 4 and installation member 7.

An exhaust passage 11 is formed on the valve seat 1, the exhaust passage 11 comprises an installation section 111 and a second guide section 112 located above the installation section 111. An installation groove 14 is placed on the top of the valve seat 1, and the installation groove 14 is in communication with the exhaust passage 11.

The blocking cover 2 is movably placed on the installation groove 14 between an open position for opening the exhaust passage 11 and a closed position for closing the exhaust passage 11, a sealing ring 3 is placed between the bottom of the blocking cover 2 and the installation groove 14, wherein the bottom wall of the blocking cover 2 tilts gradually from the center of the blocking cover 2 to the circumferential edge to form a conical guide surface 21. The inclination angle of the guide surface 21 ranges from 5 degrees to 15 degrees.

The resetting member 4 is placed on the valve seat 1 and is used to drive the blocking cover 2 to the closed position when the blocking cover 2 is in the open position. The resetting member 4 comprises an elastic member.

The installation member 7 comprises a second guide rod 71 and a stop part 72, the stop part 72 is placed at the bottom end of the second guide rod 71, the stop part 72 is accommodated in the installation section 111, the second guide rod 71 is located in the second guide section 112, two ends of the elastic member are respectively stopped between the top wall of the installation section 111 and the stop part 72, and the elastic member is in a constant compression state. The electrolytic capacitor 1000 according to the embodiment of the present utility model will be described below with reference to the drawings.

The electrolytic capacitor 1000 according to the embodiment of the present utility model comprises the pressure relief valve 100 according to any one of the above-mentioned embodiments.

The electrolytic capacitor according to the present utility model moves in the installation groove 14 through the blocking cover 2 to open the exhaust passage 11, in this way, the pressure can be relieved to reduce the internal gas pressure of the electrolytic capacitor 1000, so that the internal gas pressure of the electrolytic capacitor is always maintained within a safe range, effectively reducing the risk of valve opening in advance and slurry explosion of the product under long-term high temperature, thereby extending product life. In addition, the guide surface is conducive to orienting the direction of gas discharge.

Figure 8:
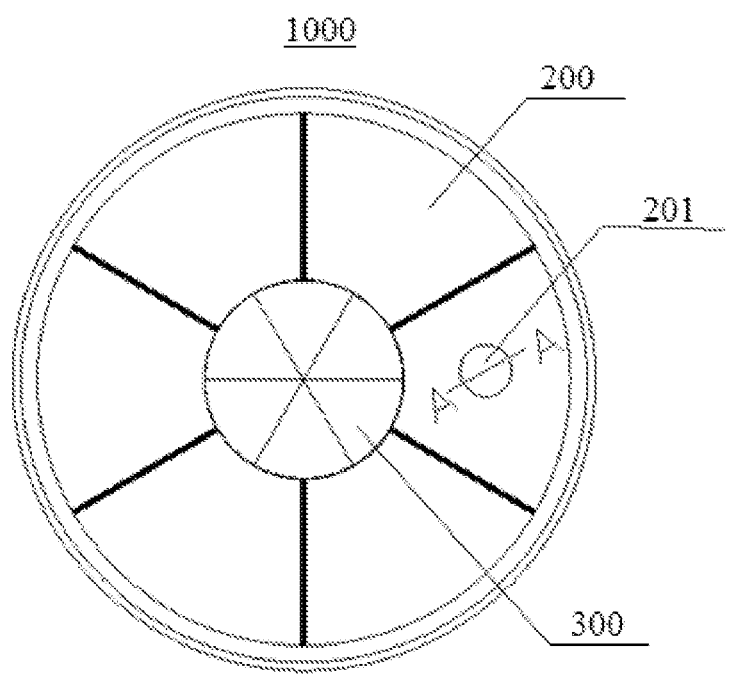
FIG. 8 is a schematic diagram of the structure of an electrolytic capacitor in an embodiment of the present utility model (including an explosion-proof valve)
Figure 9:
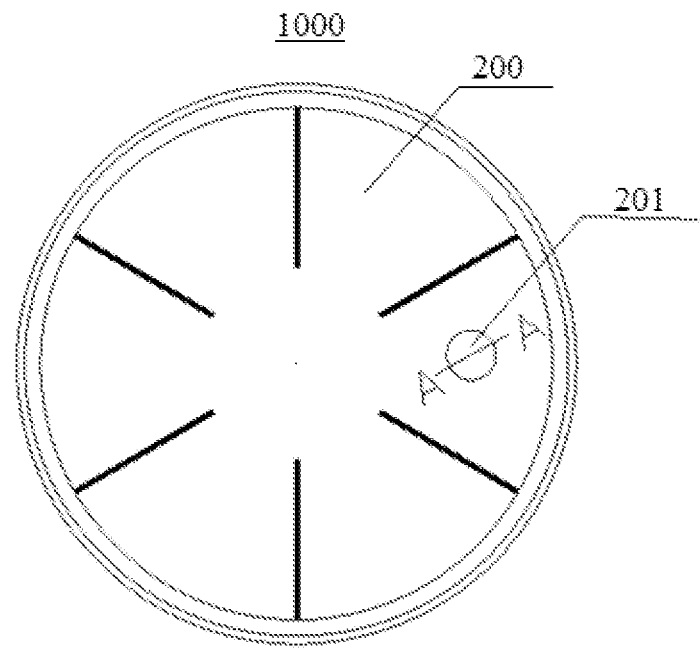
FIG. 9 is a schematic diagram of the structure of an electrolytic capacitor in an embodiment of the present utility model (the explosion-proof valve is not included)
Figure 10:
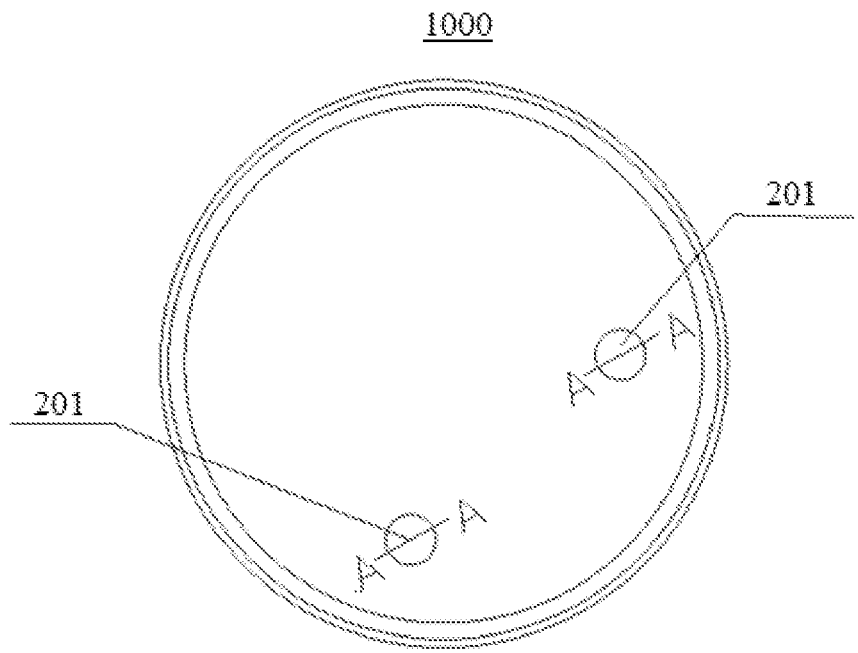
FIG. 10 is a schematic diagram of the structure of an electrolytic capacitor in an embodiment of the present utility model (including multiple installation holes of pressure relief valve)

In some embodiments, as shown in FIGS. 8-10, the pressure relief valve 100 is placed on the shell 200 of the electrolytic capacitor 1000. This design facilitates the flexible layout of the pressure relief valve 100 and is beneficial to increase the applicable range of the electrolytic capacitor 1000.

Optionally, as shown in FIG. 1, a sealing member 8 is placed between the pressure relief valve 100 and the shell of the electrolytic capacitor 1000, thereby improving the air tightness of the pressure relief valve 100. Preferably, the sealing member 8 may be an O-shaped sealing ring, made of silica gel, and will not be deformed at 150° C. Preferably, the pressure relief valve 100 can be placed at the bottom of the shell of the electrolytic capacitor 1000, which is convenient for installation and facilitates the disassembly and assembly of the pressure relief valve 100.

Figure 11:
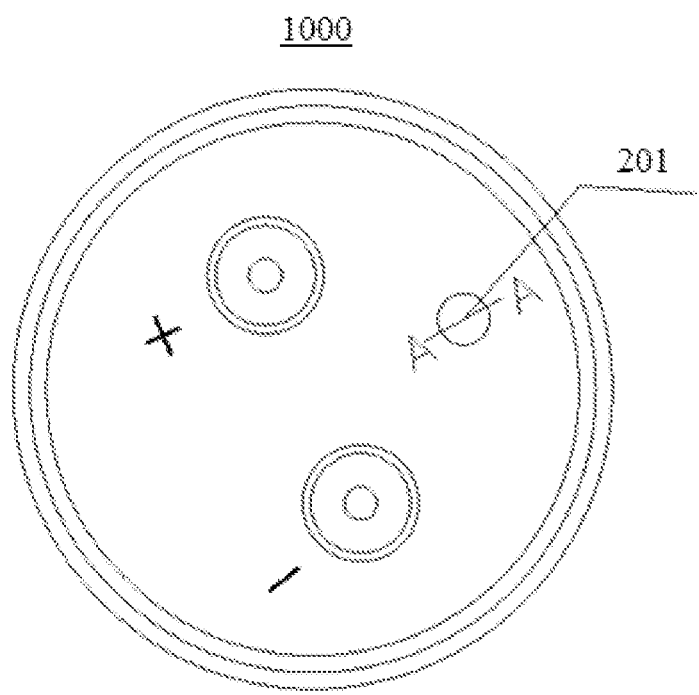
FIG. 11 is a schematic diagram of the structure of an electrolytic capacitor in an embodiment of the present utility model (the pressure relief valve is placed on the cover plate of the electrolyte capacitor)
Figure 12:
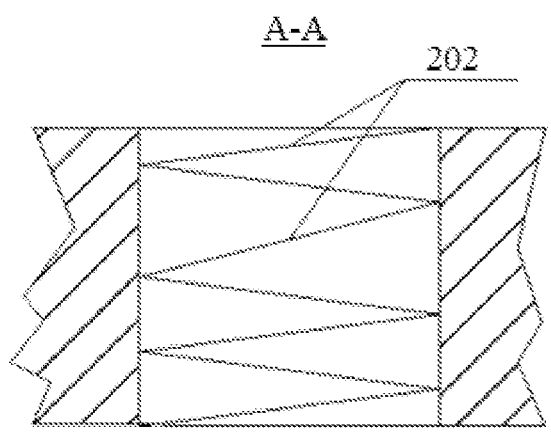
FIG. 12 is a section view of the installation hole on the electrolytic capacitor in an embodiment of the present utility model.

In some embodiments, as shown in FIG. 11, the pressure relief valve 100 is placed on the cover plate of the electrolytic capacitor 1000. This design facilitates pressure relief timely and improves the operating safety of the electrolytic capacitor 1000.

Optionally, the electrolytic capacitor 1000 can be an aluminum electrolytic capacitor, the aluminum electrolytic capacitor comprises a thick-bottomed aluminum shell, a core package and a cover plate, which can achieve high temperature resistance and safety and explosion-proof, thereby improving the operating reliability of the aluminum electrolytic capacitor.

Specifically, in a high temperature environment, when the internal gas pressure of the aluminum electrolytic capacitor exceeds a certain value M0, the pressure relief valve 100 starts to vent the gas, and the internal gas pressure of the product decreases, thereby reducing the risk of bulging, leakage or slurry explosion at the bottom of the capacitor product and extending the lifespan; when the pressure relief valve 100 automatically adjusts the internal gas pressure of the aluminum electrolytic capacitor, the internal gas pressure of the capacitor is always maintained at a lower pressure, and the bottom of the product is less bulging or even no bulging, so that the core package and the aluminum shell are in close contact, which improves heat dissipation efficiency, reduces the deterioration of working electrolyte, reduces gas generation, and slows down corrosion, etc.

The life test of the capacitor was carried out under the same conditions, the capacitor samples installed with the pressure relief valve 100 can achieve a life test of 125° C., 3000 h. The failure mode of the product is parameter failure, and there is no large bulging of the aluminum shell and liquid leakage. On the other hand, the capacitor samples without the pressure relief valve 100 usually start to exhibit a large bulging of the aluminum shell and liquid leakage at 125° C., 1500 h, and the failure mode of the product is the liquid leakage failure.

Optionally, as shown in FIG. 1, the installation section 111 is provided with an external thread structure 1112, as shown in FIGS. 8-12, an installation hole 201 is provided on the shell 200, and an internal thread structure 202 is provided on the inner wall of the installation hole 201, thereby facilitating the installation of the pressure relief valve 100 for the electrolytic capacitor 1000 and improving the installation stability of the pressure relief valve 100.

Optionally, as shown in FIGS. 8, 9 and 11, the electrolytic capacitor 1000 may comprise one installation hole 201, as shown in FIG. 10, or comprise a plurality of installation holes 201, the number of pressure relief valves 100 on the electrolytic capacitor 1000 is not limited here.

Preferably, for the applicable thick-bottomed aluminum shell, it is required to have a certain thickness at the bottom of the aluminum shell for installing the automatic pressure relief valve 100. The thread of the usually designed pressure relief valve 100 is ≥3 turns, and the tapping of the thick bottom part of the aluminum shell is required ≥3 turns, which is consistent with the installation of the pressure relief valve 100. In this way, the installation stability of the pressure relief valve 100 and the thick-bottomed aluminum shell can be improved, and the operational reliability of the electrolytic capacitor 1000 can be improved.

Optionally, according to the electrolytic capacitor 1000 of different specifications, the specifications and dimensions of the thick-bottom aluminum shell can be reasonably selected, and then the specifications and dimensions of the pressure relief valve 100 can be reasonably selected. The thick-bottom aluminum shell can be further processed according to the size of the pressure relief valve 100 to ensure that the pressure relief valve 100 can be tightly installed with the aluminum shell.

Optionally, the thick-bottom aluminum shell adopts the design of independent patent CN201721132523, the design of the thick-bottom part is not limited to the design mentioned in the patent, of course, it can also be other designs, as long as it can meet the installation of the pressure relief valve 100, and it is not limited here.

Optionally, the production process of the aluminum electrolytic capacitor 1000 is assembled according to the ordinary process, and finally the pressure relief valve 100 is installed to become a capacitor with high temperature resistance and safe explosion-proof, and then undergoes an aging process, and finally performs various performance tests.

Optionally, the starting pressure of the pressure relief valve 100 is M0, that is, when the internal pressure of the electrolytic capacitor 1000 is greater than M0, the pressure relief valve 100 opens to release the internal gas of the electrolytic capacitor 1000, until the internal pressure ≤Mt, the pressure relief valve 100 is closed and sealed. Mt<M0. The starting pressure value of the pressure relief valve 100 is selected according to the specification and dimension of the electrolytic capacitor 1000.

Optionally, as shown in FIG. 8, the electrolytic capacitor 1000 further comprises an explosion-proof valve 300. The starting pressure of the explosion-proof valve of the aluminum shell can be 1.3±0.21 MPa, so when the internal gas pressure of the electrolytic capacitor rises sharply to >1.5 MPa, the explosion-proof valve 300 will start to open normally; at other times, the internal gas pressure of the capacitor can be automatically adjusted by the pressure relief valve 100.

Other components of the electrolytic capacitor 1000 according to the embodiments of the present utility model, such as a control device and the operations, are known to those of ordinary skill in the art, and will not be described in detail here.

Reference throughout this specification to "embodiment", "example", etc., means that a particular feature, structure, material, or characteristic described in connection with the embodiment or example is included in at least one embodiment or example of the present utility model. In this specification, the schematic representations of the above-mentioned terms do not necessarily refer to the same embodiment or example. Furthermore, the particular features, structures, materials, or characteristics may be combined in any suitable manner in one or more embodiments or examples.

Although the embodiments of the present utility model have been shown and described, those of ordinary skill in the art can understand that various changes, modifications, substitutions and variations can be made to these embodiments without departing the principle and purpose of the present utility model, the scope of the present utility model is defined by the claims and their equivalents.

What is claimed is:

1. A pressure relief valve, comprising:
a valve seat, wherein an exhaust passage is formed on the valve seat, an installation groove is arranged on the top of the valve seat, and the installation groove is in communication with the exhaust passage;
a blocking cover, wherein the blocking cover is movably arranged on the installation groove between an open position for opening the exhaust passage and a closed position for closing the exhaust passage, a sealing ring is arranged between the bottom of the blocking cover and the installation groove, wherein at least a part of the bottom wall of the blocking cover forms a guide surface, and the guide surface extends from the center of the blocking cover radially outward and upward obliquely, the guide surface extends to the radial edge of the blocking cover;
wherein the bottom wall of the blocking cover tilts gradually from one end to the other end in the diameter direction of the blocking cover to form the guide surface.

2. The pressure relief valve according to claim 1, wherein the bottom wall of the blocking cover tilts gradually from the center of the blocking cover to the circumferential edge to form the guide surface.

3. The pressure relief valve according to claim 2, wherein the guide surface is a conical surface.

4. The pressure relief valve according to claim 1, wherein the inclination angle of the guide surface ranges from 5 degrees to 15 degrees.

5. The pressure relief valve according to claim 1, wherein it also comprises a resetting member, the resetting member is arranged on the valve seat and is used to drive the blocking cover to the closed position when the blocking cover is in the open position.

6. The pressure relief valve according to claim 5, wherein the resetting member comprises an elastic member.

7. The pressure relief valve according to claim 6, wherein the upper end of the elastic member is connected with the blocking cover and the lower end is fixed relative to the valve seat, and the elastic member is in a constant stretched state.

8. The pressure relief valve according to claim 7, wherein a first guide rod is arranged between the upper end of the elastic member and the blocking cover, the exhaust passage comprises a first guide section, and the first guide rod is placed in the first guide section and can move up and down.

9. The pressure relief valve according to claim 7, wherein the pressure relief valve further comprises a first base, the first base is arranged at the bottom of the valve seat, and the first base is provided with air hole, the lower end of the elastic member is fixedly connected with the first base.

10. The pressure relief valve according to claim 6, wherein the exhaust passage comprises an installation section and a second guide section located above the installation section;
the pressure relief valve further comprises an installation member, the installation member comprises a second guide rod and a stop part, the stop part is arranged at the bottom end of the second guide rod, the stop part is accommodated in the installation section, the second guide rod is located in the second guide section, two ends of the elastic member are respectively stopped between the top wall of the installation section and the stop part, and the elastic member is in a constant compression state.

11. An electrolytic capacitor, comprising the pressure relief valve according to claim 1.

12. The electrolytic capacitor according to claim 11, wherein the pressure relief valve is placed on the shell and/or the cover plate of the electrolytic capacitor.

13. A pressure relief valve, comprising:
a valve seat, wherein an exhaust passage is formed on the valve seat, an installation groove is arranged on the top of the valve seat, and the installation groove is in communication with the exhaust passage;
a blocking cover, wherein the blocking cover is movably arranged on the installation groove between an open position for opening the exhaust passage and a closed position for closing the exhaust passage, a sealing ring is arranged between the bottom of the blocking cover and the installation groove, wherein at least a part of the bottom wall of the blocking cover forms a guide surface, and the guide surface extends from the center of the blocking cover radially outward and upward obliquely, the guide surface extends to the radial edge of the blocking cover;
wherein it also comprises a resetting member, the resetting member is arranged on the valve seat and is used to drive the blocking cover to the closed position when the blocking cover is in the open position;
wherein the resetting member comprises an elastic member;
wherein the upper end of the elastic member is connected with the blocking cover and the lower end is fixed relative to the valve seat, and the elastic member is in a constant stretched state.

14. The pressure relief valve according to claim 13, wherein a first guide rod is arranged between the upper end of the elastic member and the blocking cover, the exhaust passage comprises a first guide section, and the first guide rod is placed in the first guide section and can move up and down.

15. The pressure relief valve according to claim 13, wherein the pressure relief valve further comprises a first base, the first base is arranged at the bottom of the valve seat, and the first base is provided with air hole, the lower end of the elastic member is fixedly connected with the first base.

16. A pressure relief valve, comprising:
a valve seat, wherein an exhaust passage is formed on the valve seat, an installation groove is arranged on the top of the valve seat, and the installation groove is in communication with the exhaust passage;
a blocking cover, wherein the blocking cover is movably arranged on the installation groove between an open position for opening the exhaust passage and a closed position for closing the exhaust passage, a sealing ring is arranged between the bottom of the blocking cover and the installation groove, wherein at least a part of the bottom wall of the blocking cover forms a guide surface, and the guide surface extends from the center of the blocking cover radially outward and upward obliquely, the guide surface extends to the radial edge of the blocking cover;
wherein it also comprises a resetting member, the resetting member is arranged on the valve seat and is used to drive the blocking cover to the closed position when the blocking cover is in the open position;
wherein the resetting member comprises an elastic member;
wherein the exhaust passage comprises an installation section and a second guide section located above the installation section;

the pressure relief valve further comprises an installation member, the installation member comprises a second guide rod and a stop part, the stop part is arranged at the bottom end of the second guide rod, the stop part is accommodated in the installation section, the second guide rod is located in the second guide section, two ends of the elastic member are respectively stopped between the top wall of the installation section and the stop part, and the elastic member is in a constant compression state.

\* \* \* \* \*